Jan. 24, 1950
C. APPLE
2,495,502
MILEAGE REGISTER
Filed May 31, 1946
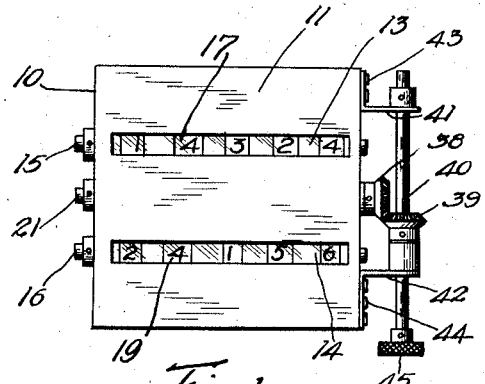
Fig. 1.
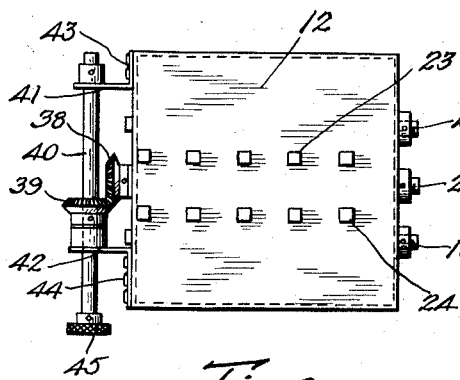
Fig. 2.
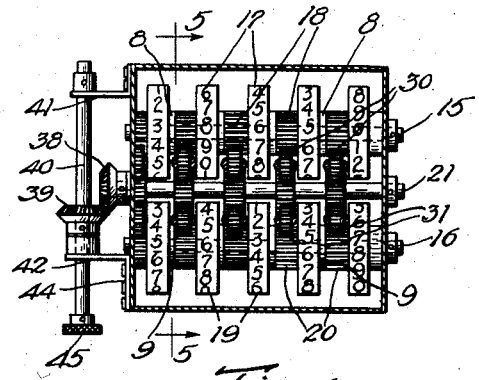
Fig. 4.
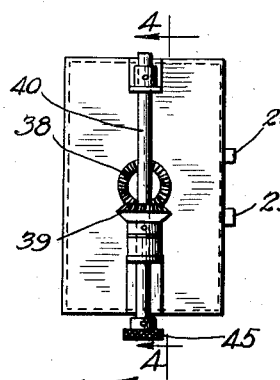
Fig. 3.
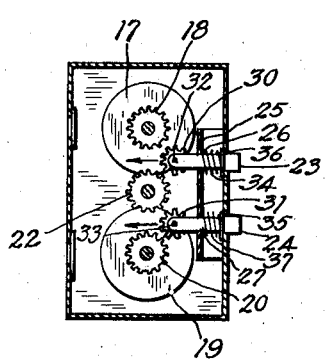
Fig. 5.
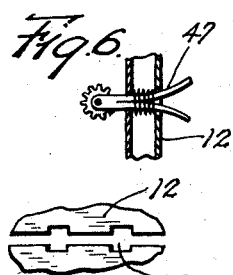
Fig. 6.
Fig. 7.
Inventor:
Carl Apple,
By B. Gordon Allen
Atty.

Patented Jan. 24, 1950

2,495,502

UNITED STATES PATENT OFFICE 2,495,502

MILEAGE REGISTER

Carl Apple, Chicago, Ill.

Application May 31, 1946, Serial No. 673,585

3 Claims. (Cl. 40—68)

The present invention relates to a mileage register for automobiles and more particularly to a register which will indicate to the automobile driver when it is time to change oil or lubrication.

The present shortage of automobiles and the necessity of driving automobiles which in normal times and under normal conditions would long since have been retired for age has focussed the attention of the average motorist upon the absolute importance of servicing his car at required periods. It is well known that such periods are generally fixed by mileage. Previously immeasurable injury has been done to automobiles because of the failure and neglect of proper service but by reason of the fact that it was customary to change models every year or two, such damage and injury was not readily apparent and was not given serious consideration.

The failure to properly service an automobile can be accounted for by the fact that there was nothing to remind the motorist or to bring to his attention the time when a change of oil or lubrication was needed. Generally, when such service was rendered if any indication of the same was made at all it was by a paper sticker fastened in some out of the way place, where it was seldom if ever seen and which in any event soon became unfastened and lost.

It is an important object of the present invention to obviate the above difficulties by providing a mileage register which cannot be lost and which can be seen at a glance by the motorist when in the driver's seat.

It is a further object of the present invention to provide a mileage register which can be attached to the cowl board or other convenient place in an automobile and which by simple manual operation the proper figures may be made to appear indicating the mileage when a change of oil and lubrication is necessary.

Numerous other objects and advantages will be apparent throughout the progress of the following specifications.

The accompanying drawing illustrates a selected embodiment of the invention and the views therein are as follows:

Fig. 1 is a face view of the improved automobile register showing the figures as they appear to the motorist.

Fig. 2 is a rear view.

Fig. 3 is an end view illustrating the adjusting mechanism.

Fig. 4 is a sectional view taken on line 4—4 of Fig. 3.

Fig. 5 is a cross section taken on line 5—5 of Fig. 4.

Fig. 6 is a side elevation partly in section of an alternative form of idler gear.

Fig. 7 is a partial view of the back plate of the improved device when the alternative form of idler gear is used.

The mileage register shown herein for the purpose of illustrating the present invention comprises a casing 10 having mileage indicating front plate 11 and a perforated back plate 12. The front plate 11 is provided with slots 13 and 14 to afford visibility to the indicator dials hereinafter explained. Other well known visibility apertures may be substituted for the slots 13 and 14.

Journaled in the casing 10 in any well known manner is shaft 15 carrying an upper series of independently rotatable co-axial indicating dials 17 and pinions 18, the number of pinions being equal to the number of dials. The pinions and dials are separated from each other by the metal discs 8 which are immovably fixed to the shaft 15. Journaled a pre-determined distance from shaft 15, is shaft 16, carrying a lower series of identical independently rotatable co-axial indicating dials 19, pinions 20 and discs 9. Each of the indicating dials in each series is provided with a zero and nine digits which are formed on the outer periphery of said dials and designed to move in alinement with the slots 13 and 14 in face plate 11. Also journaled in casing 10 and positioned equidistant between shafts 15 and 16 is the drive shaft 21 upon which is mounted a plurality of pinions 22 equal in number to the number of pinions mounted on shafts 15 and 16.

The back plate 12 of the casing 10 is provided with two series of openings, upper series 23 and lower series 24, the number of openings in each series being equal to the number of dials and pinions mounted on shafts 15 and 16 respectively. Mounted in front of said back plate 12 and directly behind the openings 23 and 24 is spring plate 25 having also two series of openings 26 and 27 corresponding to and in perfect alinement with the openings 23 and 24.

Extending through the said openings in spring plate 25 and back plate 12, and protruding a short distance therefrom as shown in Figs. 3 and 5, are the upper and lower series of notched bars 28 and 29, each bar carrying in its notched portion a single idler gear shown at 30 and 31. Each idler gear is of a required size as will hereinafter be described and are permanently held in their individual notches by pins 36 and 37. Mounted on each bar 28 and 29 between back plate 12 and spring plate 25 are coil springs 34 and 35 which are held in position by pins 36 and 37.

When in normal non-operating position the idler gears do not engage or mesh with the pinions mounted on shafts 15 and 16 or those of the drive shaft 21 but when any such idler gear is moved forward as for example by pressing on the protruding portion of any bar 28 or 29 the gear so pressed forward being of a predetermined size will engage and mesh with the corresponding pinions on the drive shaft 21 and the corresponding pinion on shaft 15 or 16.

The drive shaft 21 is provided with the bevel gear 38 which meshes with bevel gear 39 mounted on shaft 40, said shaft being fastened to the side of the outer face of casing 10 by brackets 41 and 42, secured by screws or rivets 43 and 44, the drive shaft being operated from the outside of casing 10 by turning shaft 40. The lower end of said shaft is provided with the knurled nut 45 for easy operation.

In practice the desired numerals are caused to appear in slots 13 and 14 in the following manner. Each dial being provided with an independent pinion and idler gear revolves separately. By pressing on the protruding end of any indicated bar 28 or 29 the desired pinions are engaged and by turning the nut 45 the drive shaft operates to cause the desired numeral on a selected dial to appear in the slot. Upon removing the pressure on the bar, the springs 34 or 35 operate to disengage the idler gear and restore it to normal non-operating position.

The manner of engaging the idler gears may take different forms, one preferred embodiment being shown in Fig. 5 and an alternative form shown in Figs. 6 and 7. This form provides a continuous slot 46 in the back plate 12 and a spring biased idler gear carrier such as shown at 47 in Fig. 6. When such alternative form is used, it is necessary to employ only one idler gear for each series and such idler gear may be caused to move freely in slot 46 and to engage at any desired position.

The present invention provides a device which is simple and fool proof and which obviates all the defects heretofore encountered.

Changes may be made in form and construction without departing from the spirit of the invention or sacrificing any of its advantages and the right is hereby reserved to make all changes as fairly fall within the scope of the following claims.

What is claimed as new and desired to be secured by Letters Patent of the United States is as follows:

1. In a device of the class described, the combination of a casing having indicating slots on the face thereof, a plurality of shafts journaled in said casing, each shaft carrying a series of independently rotatable, co-axial dials and a series of pinions rotatable with said dials, a manually rotatable drive shaft carrying pinions for imparting motion to said dials, idler gears mounted on the back plate of said casing, and movable mounting means for the idler gears whereby said idler gears may be independently moved into and out of meshing relation with respect to the drive pinions and dial pinions.

2. A register of the class described comprising in combination a casing having indicating apertures in the face thereof, a series of shafts journaled in said casing, each shaft carrying a plurality of independently rotatable co-axial indicator dials and a plurality of pinions, one for each dial and rotatable therewith, a manually rotatable drive shaft positioned parallel with the axis of said dials having a plurality of pinions mounted thereon, a plurality of idler gears, one for each dial mounted on the back plate of said casing, and movable mounting means for the idler gears whereby said idler gears may be independently moved into and out of meshing relation with respect to the drive pinions and dial gears.

3. In a device of the class described, the combination of a casing having indicating apertures on the face thereof, a plurality of shafts journaled in said casing, each shaft carrying a plurality of independently rotatable co-axial dials and a plurality of pinions, one for each dial and rotatable therewith, a manually rotatable drive shaft having a plurality of pinions mounted thereon, said drive shaft having means for operation mounted on the outside of said casing, and a plurality of idler gears, one for each dial mounted on the back plate of said casing, spring means holding said gears from engagement with said idler gears, and movable mounting means for the idler gears whereby said idler gears may be independently moved into and out of meshing relationship with respect to the drive pinions and dial pinions.

CARL APPLE.

REFERENCES CITED

The following references are of record in the file of this patent:

UNITED STATES PATENTS

| Number | Name | Date |
|---|---|---|
| 1,742,567 | West | Jan. 7, 1930 |
| 1,749,365 | Zubaty | Mar. 4, 1930 |
| 1,816,557 | Zahodiakin | July 28, 1931 |

FOREIGN PATENTS

| Number | Country | Date |
|---|---|---|
| 400,158 | Germany | Aug. 7, 1924 |